US009921806B2

(12) United States Patent
Ding et al.

(10) Patent No.: US 9,921,806 B2
(45) Date of Patent: Mar. 20, 2018

(54) METHOD AND APPARATUS FOR SWITCHING AUDIO OUTPUT DEVICE

(71) Applicant: TENCENT TECHNOLOGY (SHENZHEN) COMPANY LIMITED, Shenzhen, Guangdong (CN)

(72) Inventors: Yu Ding, Shenzhen (CN); Peng Zhang, Shenzhen (CN); Yecheng Xian, Shenzhen (CN); Kui Fang, Shenzhen (CN); Peiqiu Wu, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 15/185,609

(22) Filed: Jun. 17, 2016

(65) Prior Publication Data

US 2016/0291931 A1 Oct. 6, 2016

Related U.S. Application Data

(63) Continuation of application No. PCT/CN2015/071105, filed on Jan. 20, 2015.

(30) Foreign Application Priority Data

Jan. 20, 2014 (CN) .......................... 2014 1 0026394

(51) Int. Cl.
*G06F 3/16* (2006.01)
*G10L 17/22* (2013.01)
(Continued)

(52) U.S. Cl.
CPC .............. *G06F 3/167* (2013.01); *G06F 3/048* (2013.01); *G06F 3/04842* (2013.01); *G06F 9/48* (2013.01);
(Continued)

(58) Field of Classification Search
None
See application file for complete search history.

(56) References Cited

U.S. PATENT DOCUMENTS

| | | | |
|---|---|---|---|
| 6,993,367 B2 | 1/2006 | Yamato et al. | |
| 2005/0191994 A1* | 9/2005 | May ................... | H04M 1/7255 455/412.2 |

(Continued)

FOREIGN PATENT DOCUMENTS

| | | |
|---|---|---|
| CN | 1356848 A | 7/2002 |
| CN | 101720550 A | 6/2010 |

(Continued)

OTHER PUBLICATIONS

International Preliminary Report for Application No. PCT/CN2015/071105 dated Jul. 26, 2016.
(Continued)

*Primary Examiner* — Joshua Kaufman
*Assistant Examiner* — Qin Zhu
(74) *Attorney, Agent, or Firm* — Harness, Dickey & Pierce, P.L.C.

(57) ABSTRACT

A method for switching an audio output device includes after a predetermined event is captured on the information output interface, detecting whether a voice interface object representing a voice message is currently displayed on the information output interface. The method further includes detecting whether an external audio output device is currently connected to the mobile electronic apparatus. If it is detected that a voice interface object is currently displayed, and it is not detected that an external audio output device is connected to the mobile electronic apparatus, displaying an interface switching object on the information output inter-
(Continued)

face, to correspondingly switch an audio output device of the mobile electronic apparatus according to an input operation of a user.

8 Claims, 14 Drawing Sheets

(51) Int. Cl.
    *G06F 3/0484*     (2013.01)
    *H04M 1/725*     (2006.01)
    *G06F 9/48*     (2006.01)
    *G06F 3/048*     (2013.01)

(52) U.S. Cl.
    CPC ........... *G10L 17/22* (2013.01); *H04M 1/7255* (2013.01); *H04M 2250/22* (2013.01)

(56) References Cited

U.S. PATENT DOCUMENTS

| | | | |
|---|---|---|---|
| 2005/0192061 A1* | 9/2005 | May | H04M 1/6066 455/563 |
| 2005/0282589 A1 | 12/2005 | Bameah | |
| 2007/0142942 A1 | 6/2007 | Hyatt | |
| 2009/0003620 A1 | 1/2009 | McKillop et al. | |
| 2010/0080084 A1 | 4/2010 | Chen et al. | |
| 2010/0104111 A1* | 4/2010 | Nakabayashi | G08C 17/02 381/86 |
| 2011/0022203 A1 | 1/2011 | Woo et al. | |
| 2014/0221049 A1* | 8/2014 | Kim | H04M 1/56 455/566 |

FOREIGN PATENT DOCUMENTS

| | | |
|---|---|---|
| CN | 101867657 A | 10/2010 |
| CN | 101963885 A | 2/2011 |

OTHER PUBLICATIONS

International Search Report for Application No. PCT/CN2015/071105 dated Apr. 20, 2015.

* cited by examiner

METHOD AND APPARATUS FOR SWITCHING AUDIO OUTPUT DEVICE

CROSS-REFERENCE TO RELATED APPLICATIONS

This application is a continuation of International Application No. PCT/CN2015/071105, filed Jan. 20, 2015. This application claims the benefit and priority of Chinese Application No. 201410026394.8, filed Jan. 20, 2014. The entire disclosures of each of the above applications are incorporated herein by reference.

FIELD

The present disclosure relates to audio device management for an electronic terminal and to switching an audio output device.

BACKGROUND

This section provides background information related to the present disclosure which is not necessarily prior art.

Current network-based instant messaging technologies have become an important means for people to contact each other. Instant messaging also has voice information instead of being limited to text communication. There may be multiple kinds of audio output apparatuses for outputting voice information, for example, a handset, a loudspeaker, or an earphone. Theses audio output apparatuses can meet a demand of a user in different scenarios. However, a demand of a user may change with the change of the environment; therefore, it is necessary to provide a more convenient method for switching an audio output device.

SUMMARY

This section provides a general summary of the disclosure, and is not a comprehensive disclosure of its full scope or all of its features.

Various embodiments of the present disclosure provide a method and an apparatus for switching an audio output device, which can enable a user to more conveniently switch the audio output device, thereby meeting an actual demand of a user.

A method for switching an audio output device is applied to a mobile electronic apparatus, where the mobile electronic apparatus includes an information output interface, and the method includes the following:

after a predetermined event is captured on the information output interface, detecting whether a voice interface object representing a voice message is currently displayed on the information output interface and detecting whether an external audio output device is currently connected to the mobile electronic apparatus; and if it is detected that a voice interface object is currently displayed, and it is not detected that an external audio output device is connected to the mobile electronic apparatus, displaying an interface switching object on the information output interface to correspondingly switch an audio output device of the mobile electronic apparatus according to an input operation of a user.

An apparatus for switching an audio output device is applied to a mobile electronic apparatus, where the mobile electronic apparatus includes an information output interface, and the apparatus includes:

a detection module, configured to, after a predetermined event is captured on the information output interface, detect whether a voice interface object representing a voice message is currently displayed on the information output interface and detect whether an external audio output device is currently connected to the mobile electronic apparatus; and an interface switching object display module, configured to, if it is detected that a voice interface object is currently displayed and it is not detected that an external audio output device is connected to the mobile electronic apparatus, display an interface switching object on the information output interface to correspondingly switch an audio output device of the mobile electronic apparatus according to an input operation of a user.

According to the method and the apparatus, when there is voice information on a current screen, an interface switching object is displayed, which can enable a user to conveniently switch an audio output device, thereby meeting an audio output demand of a user in different scenarios.

To make the foregoing and other methods, features, and benefits of the present disclosure more comprehensible, the following uses various embodiments for detailed descriptions below with reference to the accompanying drawings.

Further areas of applicability will become apparent from the description provided herein. The description and examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

To further explain the technical means used in the present disclosure for achieving the intended goals and the effects thereof, implementation methods, structures, features, and effects of the present disclosure are described in detail below with reference to the accompany drawings and various embodiments.

Figure 1:
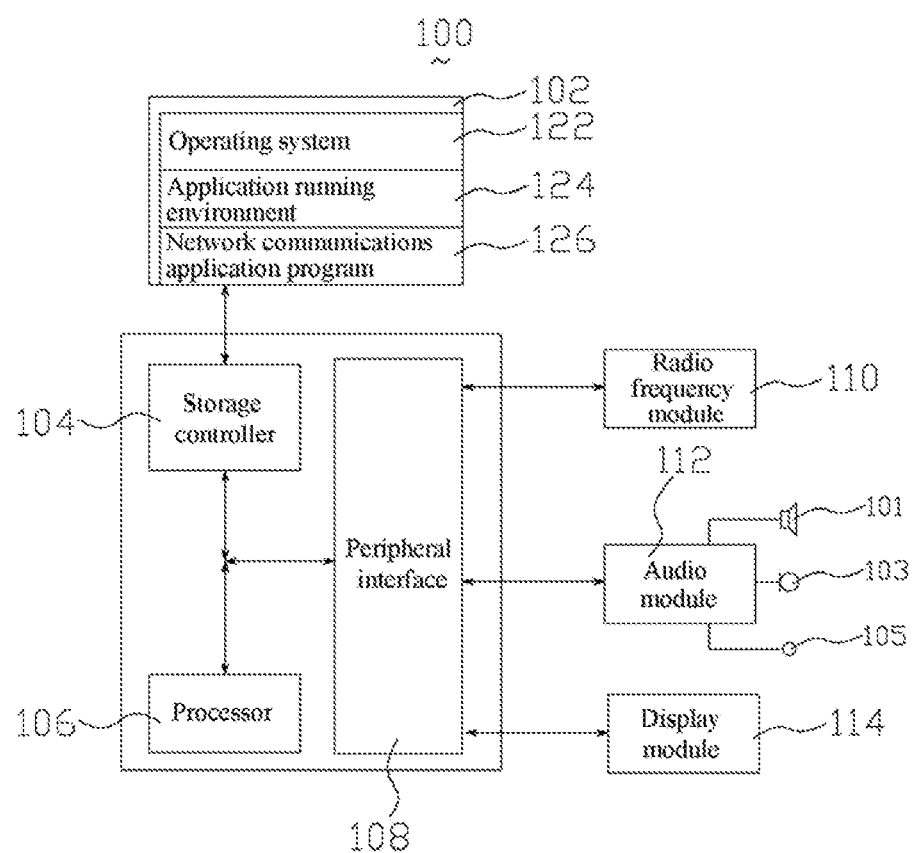
FIG. 1 is a structural block diagram of a mobile electronic apparatus according to various embodiments.

FIG. 1 shows a structural block diagram of a mobile electronic apparatus. As shown in FIG. 1, the mobile electronic apparatus 100 includes a memory 102, a storage controller 104, one or more (one is shown in FIG. 1) processors 106, a peripheral interface 108, a radio frequency module 110, an audio circuit 112, and a display module 114. A person of ordinary skill in the art may understand that FIG. 1 shows a schematic structure, and does not constitute a limitation to the structure of the mobile electronic apparatus 100. For example, the mobile electronic apparatus 100 may also include more or fewer components than those shown in FIG. 1, or have a configuration different from that shown in FIG. 1.

The memory 102 may be configured to store a software program and a module, such as a program instruction/module corresponding to the method and the apparatus for switching an audio output device in the various embodiments of the present disclosure. The processor 106 implements the method by running the software program and the module stored in the memory 102. The memory 102 may include a high-speed random access memory, and may also include a non-volatile memory, for example, one or more magnetic storage apparatuses, flash memories, or other non-volatile solid-state memories. According to various embodiments, the memory 102 may further include memories remotely disposed relative to the processor 106, and these remote memories may be connected to the mobile electronic apparatus 100 through a network. Examples of the network include, but are not limited to, the Internet, an enterprise intranet, a local area network, a mobile communications network, and a combination thereof. The processor 106 and other possible components may access the memory 102 under the control of the storage controller 104.

The peripheral interface 108 couples various input/output apparatuses to the processor 106. The processor 106 runs various types of software and instructions in the memory 102, so as to enable the mobile electronic apparatus 100 to perform various functions and perform data processing. According to various embodiments, the peripheral interface 108, the processor 106, and the storage controller 104 may be implemented in a single chip. In various embodiments, they may be separately implemented by an independent chip.

The radio frequency module 110 is configured to receive and send an electromagnetic wave, and implement mutual conversion between the electromagnetic wave and an electric signal, so as to communicate with a communications network or another device. The radio frequency module 110 may include various existing circuit elements for performing these functions, such as an antenna, a radio frequency transceiver, a digital signal processor, a cipher/decipher chip, a subscriber identity module (SIM) card, and a memory. The radio frequency module 110 may communicate with various networks, such as the Internet, an enterprise intranet, and a wireless network, or communicate with other devices by using a wireless network.

The foregoing wireless network may include a cellular telephone network, a wireless local area network, or a metropolitan area network. The foregoing wireless network may use various communications standards, protocols, and technologies, which include, but are not limited to, a Global System for Mobile Communications (GSM), an Enhanced Data rates for GSM Evolution (EDGE), a Wideband Code Division Multiple Access (W-CDMA) technology, a Code Division Multiple Access (CDMA) technology, a Time Division Multiple Access (TDMA) technology, a Wireless Fidelity (WiFi) technology (for example, the standards of the US Institute of Electrical and Electronics Engineers IEEE 802.11a, IEEE 802.11b, IEEE802.11g and/or IEEE 802.11n), Voice over Internet Protocol (VoIP), Worldwide Interoperability for Microwave Access (Wi-Max), other protocols used for email, instant messaging and a short message service message, and any other suitable communications protocols, and even may include some protocols that have not been developed at present.

The audio circuit 112, a loudspeaker 101, a sound jack 103, and a microphone 105 together provide an audio interface between a user and the mobile electronic apparatus 100. The audio circuit 112 receives audio data from the processor 106, converts the audio data into an electric signal, and transmits the electric signal to the loudspeaker 101. The loudspeaker 101 converts the electric signal into an acoustic wave audible to the human ear. The audio circuit 110 further receives an electric signal from the microphone, converts the electric signal into audio data, and transmits the audio data to the processor 106 for further processing. The audio data may be acquired from the memory 102 or by the radio frequency module 110. In addition, the audio data may also be stored in the memory 102 or sent by the radio frequency module 110.

The display module 114 is configured to display information input by a user or information provided for a user, and various graphical user interfaces of the mobile electronic apparatus 100. The graphical user interfaces may be formed by a graph, text, an icon, a video, and any combination thereof. According to various embodiments, the display module 114 includes a display panel. The display panel may be a liquid crystal display (LCD) panel, an organic light-emitting diode display (OLED) panel, an electro-phoretic display (EPD) panel, or the like. Further, a touch surface may be disposed on the display panel to form a whole with the display panel. In various other embodiments, the display module 114 may further include a display apparatus of another type, for example, a projection display apparatus. Compared with a general display panel, the projection display apparatus further needs to include some components used for projection, for example, a lens group.

The software program and the module stored in the memory 102 may include an operating system 122, an application running environment 124, and a network communications application program 126. The operating system 122, for example, may be Android, IOS, or Windows Mobile, may include various software components and/or drivers used for system task management (for example, memory management, storage device control, and power supply management), and may communicate with various hardware or software components, thereby providing a running environment for other software components. The application running environment 124 runs based on the operating system 122, and provides some basic services, for example, a database service, for other application programs. Using an Android system for an example, the database service is a Sqlite database service. The network communications application program 126 runs based on the operating system 122 and the application running environment 124, and provides a network communications function, where the network communications function, for example, refers to sending and receiving of information such as text, voice, and a video by using a server.

Figure 2:
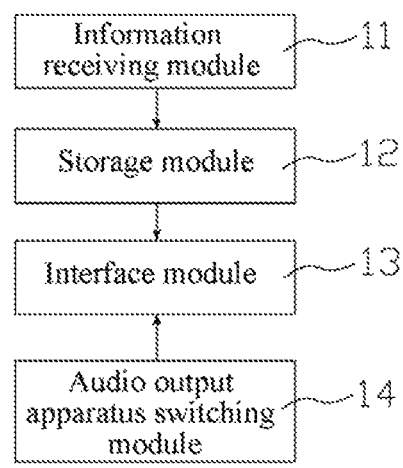
FIG. 2 is a module block diagram of a network communications application program for the mobile electronic apparatus in FIG.

Further, referring to FIG. 2, the network communications application program 124 includes an information receiving module 11, a storage module 12, an interface module 13, and an audio output apparatus switching module 14. The information receiving module 11 is configured to access the Internet by using the radio frequency module 110, and communicate with a server to receive information sent by the server, and send the received information to the storage module 12 for storage. The storage module 12 is configured to store the received information in a database or a file, and return corresponding information according to a request of another module. The interface module 13 is configured to acquire a message and display the message on an interface.

Figure 3:
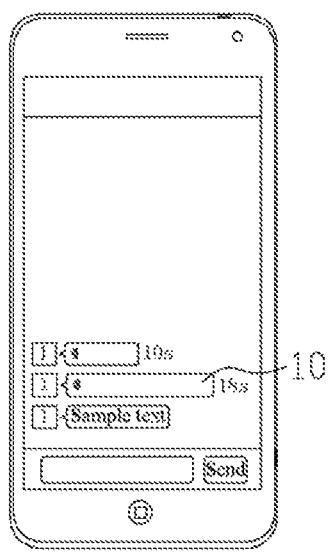
FIG. 3 is a diagram of an interface of a network communications application program in the mobile electronic apparatus in FIG. 1.

Referring to FIG. 3, for text information, a text interface object can be displayed directly, and text in the text interface object can be displayed directly, and for voice information, a voice interface object 10 can be displayed, but the voice information cannot be output directly. The voice interface object 10 may respond to an operation of a user. For example, after the user presses the voice interface object 10, a playback operation on corresponding voice information is triggered. The voice interface object 10 has a certain size, and a length thereof may also be changed according to a length of voice information. For example, longer duration of voice information indicates a larger length of the voice interface object 10. Regardless of the duration of voice information, the length of the voice interface object 10 should not exceed the width of a screen.

The audio output apparatus switching module 14 is configured to display or hide an interface switching object below, to enable the user to conveniently switch the audio output device, and a process thereof is described with reference to the following various embodiments.

Figure 4:
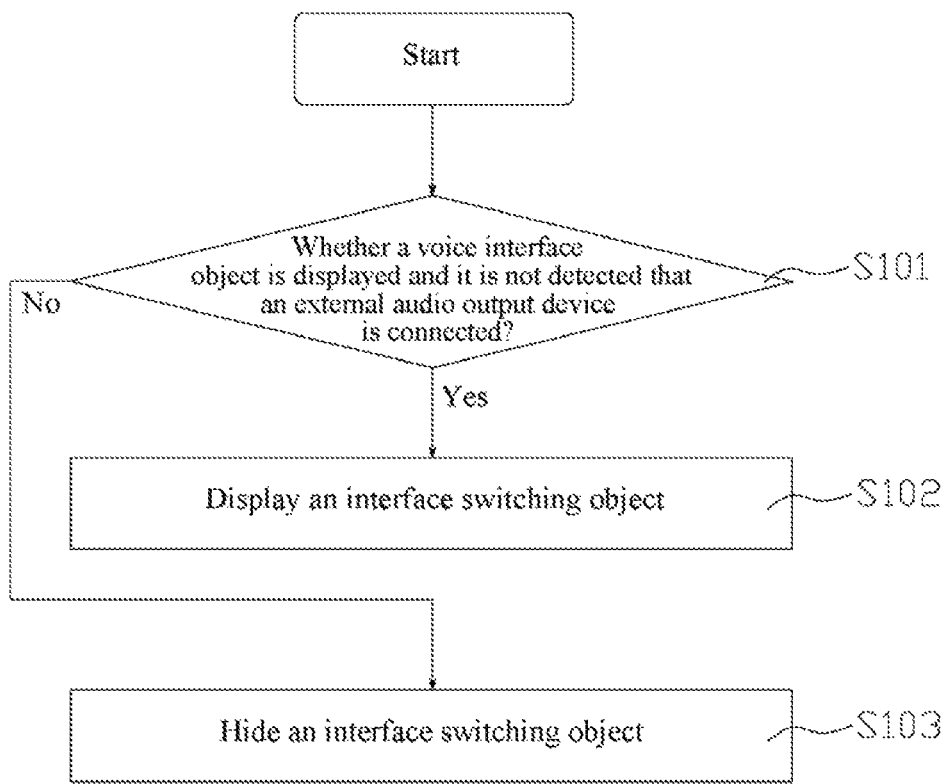
FIG. 4 is a flowchart of a method for switching an audio output device according to various embodiments.

FIG. 4 is a flowchart of a method for switching an audio output device according to various embodiments. The method in FIG. 4 may be applied to the information output interface shown in FIG. 3. The method of FIG. 4 includes the following.

Block S101: After a predetermined event is captured on the information output interface, detect whether a voice interface object representing a voice message is currently displayed on the information output interface, and detect whether an external audio output device is currently connected to the mobile electronic apparatus. Using an IOS system as an example, the information output interface shown in FIG. 3 may be implemented by using a View category, which can support multiple events and the predetermined event, for example, may include: the information output interface is entered, sliding of the information output interface ends, content of the information output interface is changed, and the like. After these predetermined events are captured, it starts to detect whether a voice interface object is currently displayed and detect whether there is an external audio output device.

On the information output interface, to facilitate use, sliding of the interface is divided into three phases. The first phase calculates, according to a moving distance du of a finger of the user on a screen and a time to from pressing to releasing, an average moving velocity of the finger of the user on the screen, that is Vu=du/tu, where Vu actually is the number of pixels moved by the finger of the user in the unit time. Y then coordinates on the screens of all information interface objects (including a text interface object and the voice interface object) and they are modified by using a timer and according to a certain accelerated velocity, until a product of the accelerated velocity and the time is equal to Vu, and content displayed in this phase is expressed as moving upwards/downwards on the screen in an accelerated manner. In the second phase, when the velocity reaches Vu, y coordinates on the screens of the information interface objects are modified at a constant velocity, duration is duxScale, where Scale is a fixed scale factor, and content displayed in this phase is expressed as moving upwards/downwards on the screen at a constant velocity. The third phase is a phase in which the velocity gradually decreases from Vu to 0, and content displayed in this phase is expressed as that the moving speed gradually decreases and becomes zero. The foregoing third phase may also be regarded as when the sliding of the information output interface in the predetermined event ends.

According to various embodiments, the detecting whether a voice interface object representing a voice message is currently displayed on the information output interface includes the following. Acquiring all voice interface objects on the information output interface, performing intersection detection on a coordinate range of each voice interface object and a current screen, and if at least one voice interface object intersects the current screen, determining that a voice interface object is currently displayed. Detecting whether an external audio output device is currently connected to the mobile electronic apparatus may be implemented by means of system invoking.

Block S102: If it is detected that a voice interface object is currently displayed, and it is not detected that an external audio output device is connected to the mobile electronic apparatus, display an interface switching object on the information output interface, where the interface switching object is used for correspondingly switching an audio output device of the mobile electronic apparatus according to an input operation of a user.

Figure 5:
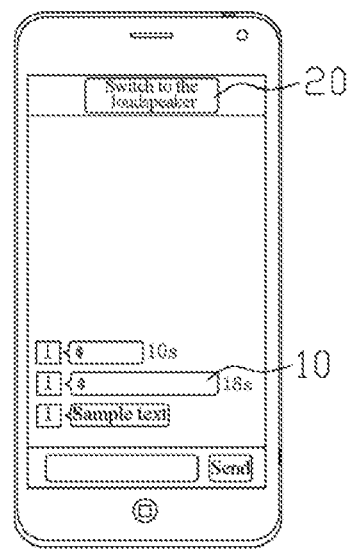
FIG. 5 is a diagram of an interface of a mobile electronic apparatus in an execution process of the method in FIG. 4.

Referring to FIG. 5, when it is detected that a voice interface object is currently displayed, and it is not detected that an external audio output device is connected to the mobile electronic apparatus, an interface switching object 20 may be displayed on the information output interface. The interface switching object 20, for example, may be a button, and is not limited, and for any suitable interface object, an interface object can be used as long as the interface object can receive an operation of a user and trigger a procedure of switching the audio output device. Content of the interface switching object 20 may further correspond to a current audio output device. For example, if the current audio output device is a handset, a function of the interface switching object 20 should be switching the audio output device to a loudspeaker; therefore, the content of the interface switching object 20 may include text or an icon that represents switching of the audio output device to the loudspeaker. If the current audio output device is a loudspeaker, a function of the interface switching object 20 should be switching the audio output device to a handset; therefore, the content of the interface switching object 20 may include text or an icon that represents switching of the audio output device to the handset.

After a predetermined event is captured from the interface switching object 20, for example, when a user presses the interface switching object 20, the procedure of switching the audio output device begins. Code for setting a system playback mode may be executed to set a corresponding system parameter. Using the IOS system as an example, the system parameter, for example, may include audioCategory or audioRoute. If the audio output device needs to be switched to a handset, the audioCategory and the audioRoute need to be set at the same time, and if the audio output device needs to be switched to a loudspeaker, only the audioCategory is set.

Further, in block S101, if a detection result indicates that no voice interface object is currently displayed, or an external audio output device, for example, an earphone, is connected to the mobile electronic apparatus, block S103 of hiding the interface switching object is performed. In addition, before block S103, it may be further determined whether the interface switching object is displayed, and the interface switching object is hidden only when the interface switching object is displayed.

According to the method in various embodiments, when there is voice information on a current screen, an interface switching object is displayed, which can enable a user to conveniently switch an audio output device, thereby meeting an audio output demand of the user in different scenarios.

Figure 6:
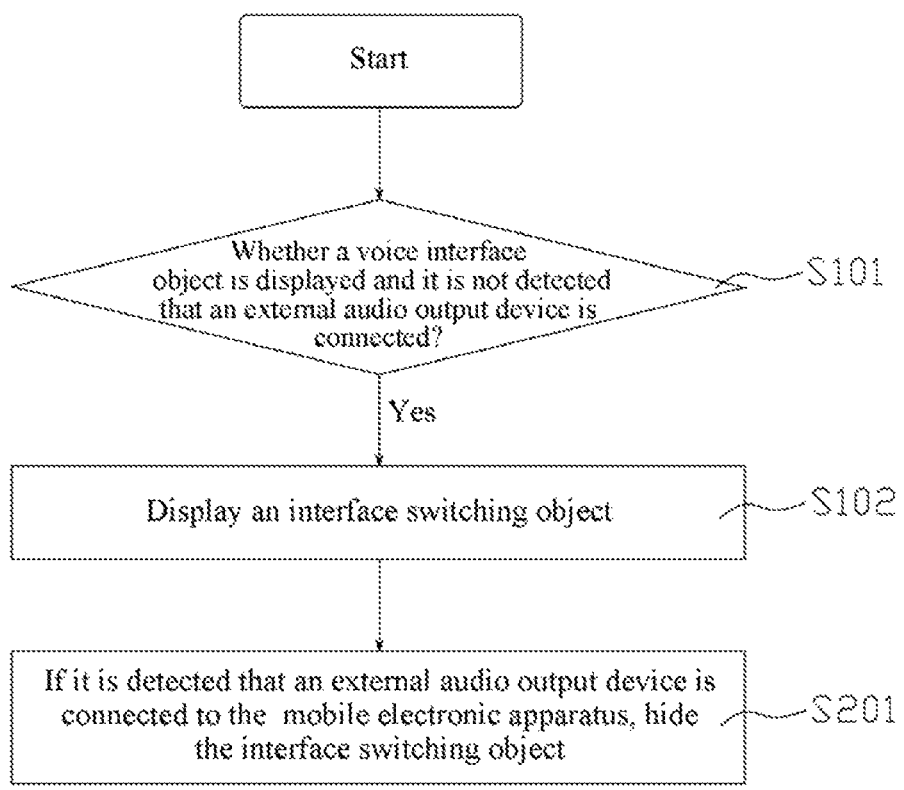
FIG. 6 is a flowchart of a method for switching an audio output device according to various embodiments.

Various embodiments provide a method for switching an audio output device, which is similar to the method in the various embodiments, but also different from the method in the various embodiments in that, referring to FIG. 6, after block S102, the method in this various embodiment further includes block S201: If it is detected that an external audio output device is connected to the mobile electronic apparatus, hiding the interface switching object.

For example, a callback may be registered in an operating system 122 and is executed after a user inserts an earphone or a Bluetooth earphone is connected, for notifying that the interface switching object is hidden or directly triggering and performing block S101.

As described in the various embodiments, a process of detecting whether there is voice information and whether there is an external audio output device is triggered only after the predetermined event is captured on the information output interface. However, in a case in which the information output interface remains unchanged (the predetermined event is not captured), the user may insert an earphone or a Bluetooth earphone is connected. In this case, block S101 can only be triggered by means of a system callback, or the interface switching object is directly hidden.

According to the method in various embodiments, when a predetermined event is not detected on an information output interface, an interface switching object can still be hidden in time, which increases available space of the information output interface.

Figure 7:
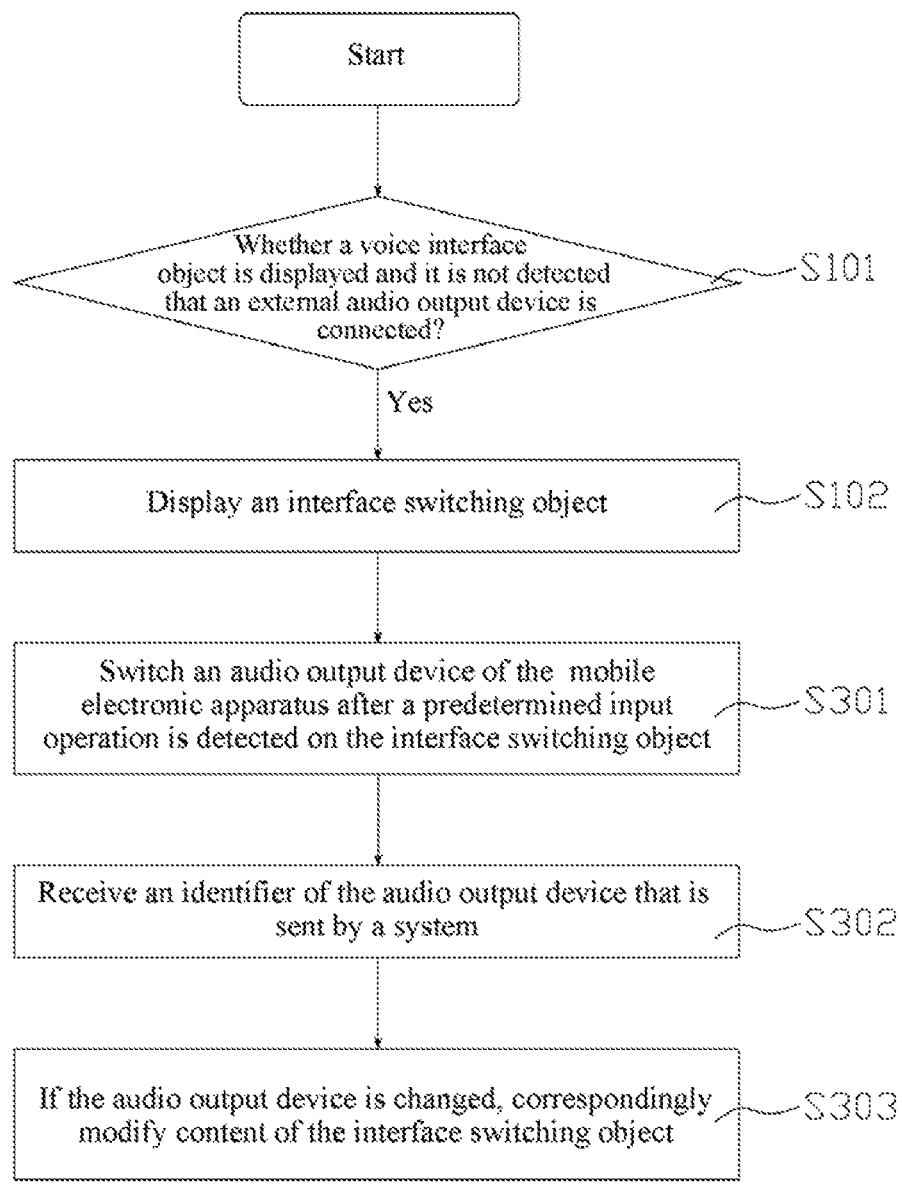
FIG. 7 is a flowchart of a method for switching an audio output device according to various embodiments.

Various embodiments provide a method for switching an audio output device, which is similar to the method in the various embodiments, but also different from the method in the various embodiments in that, referring to FIG. 7, after block S102, the method in various embodiments further includes the following.

Block S301: Switch the audio output device of the mobile electronic apparatus after a predetermined input operation is detected on the interface switching object. After a predetermined event is captured from the interface switching object 20, for example, when the user presses the interface switching object 20, a procedure of switching the audio output device begins. Code for setting a system playback mode may be executed to set a corresponding system parameter. Using an IOS system as an example, the system parameter, for example, may include audioCategory or audioRoute. If the audio output device needs to be switched to a handset, the audioCategory and the audioRoute need to be set at the same time, and if the audio output device needs to be switched to a loudspeaker, only the audioCategory is set.

Block S302: Receive an identifier of the audio output device that is sent by a system. A notification of the identifier of the audio output device that is sent by the system is received by listening to a system event.

Block S303: If the audio output device is changed, correspondingly modify content of the interface switching object. It is determined, according to the identifier of the audio output device that is sent by the system and an identifier of the audio output device of the mobile electronic apparatus before system invoking is performed to switch the audio output device, whether the audio output device is changed. After the audio output device is successfully switched, the content of the interface switching object 20 may be modified. For example, when the audio output device is switched from a loudspeaker to a handset, the content of the interface switching object 20 may be text or an icon that represents switching of the audio output device to the loudspeaker. When the audio output device is switched from a handset to a loudspeaker, the content of the interface switching object 20 may be text or an icon that represents switching of the audio output device to the handset.

According to the method in various embodiments, after an audio output device is switched, content of an interface switching object is further correspondingly modified, so that the interface switching object is more visual.

Figure 8:
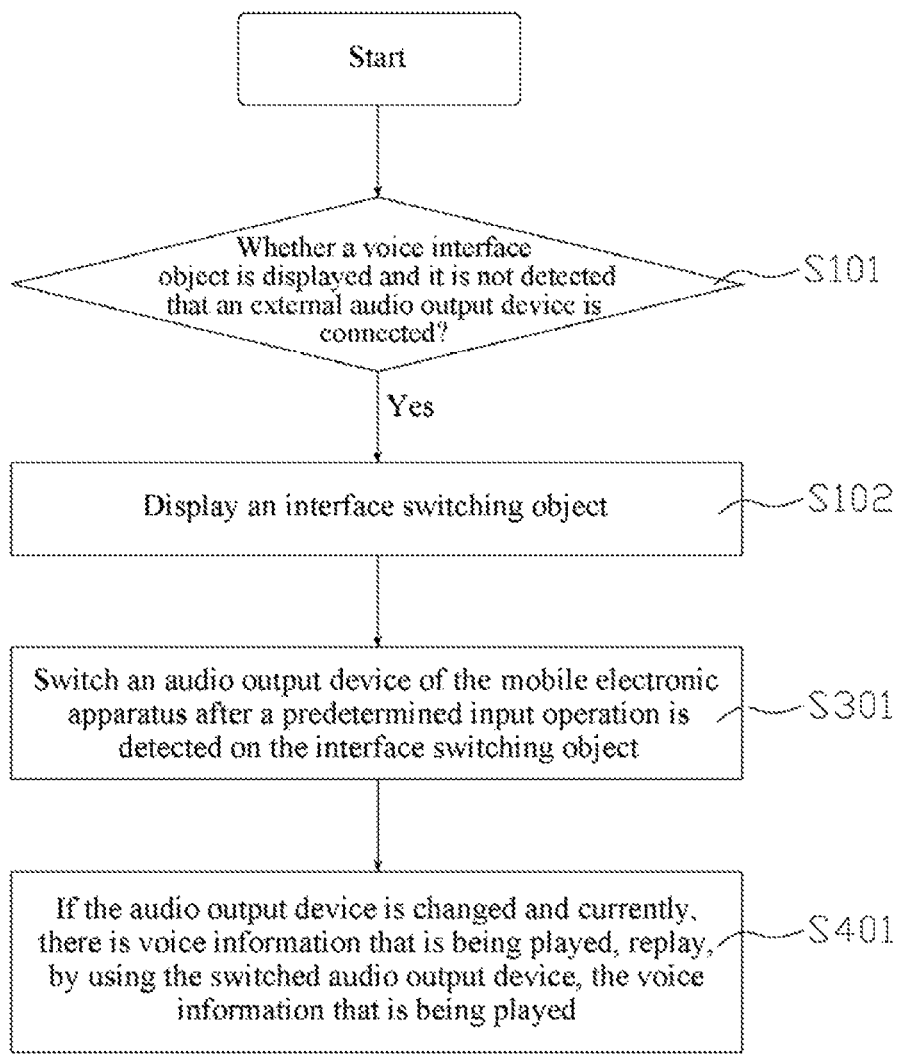
FIG. 8 is a flowchart of a method for switching an audio output device according to various embodiments.

Various embodiments provide a method for switching an audio output device, which is similar to the method in the various embodiments, but also different from the method in the various embodiments in that, referring to FIG. 8, after block S301, the method in various embodiments further includes block S401: if the audio output device is changed and current, there is voice information that is being played, replaying, by using the switched audio output device, the voice information that is being played.

For example, currently, there is voice information being played by using a handset, in a playback process, the user may switch the audio output device to a loudspeaker by using the interface switching object 20, and after the audio output device is switched according to the method in the foregoing various embodiments, the voice information that is being played is replayed by still using the switched audio output device. That is, the voice information that is being played is replayed by using the loudspeaker.

According to the method in various embodiments, when a user switches an audio output device, related voice information can be automatically played, which makes use more convenient for a user.

Figure 9:
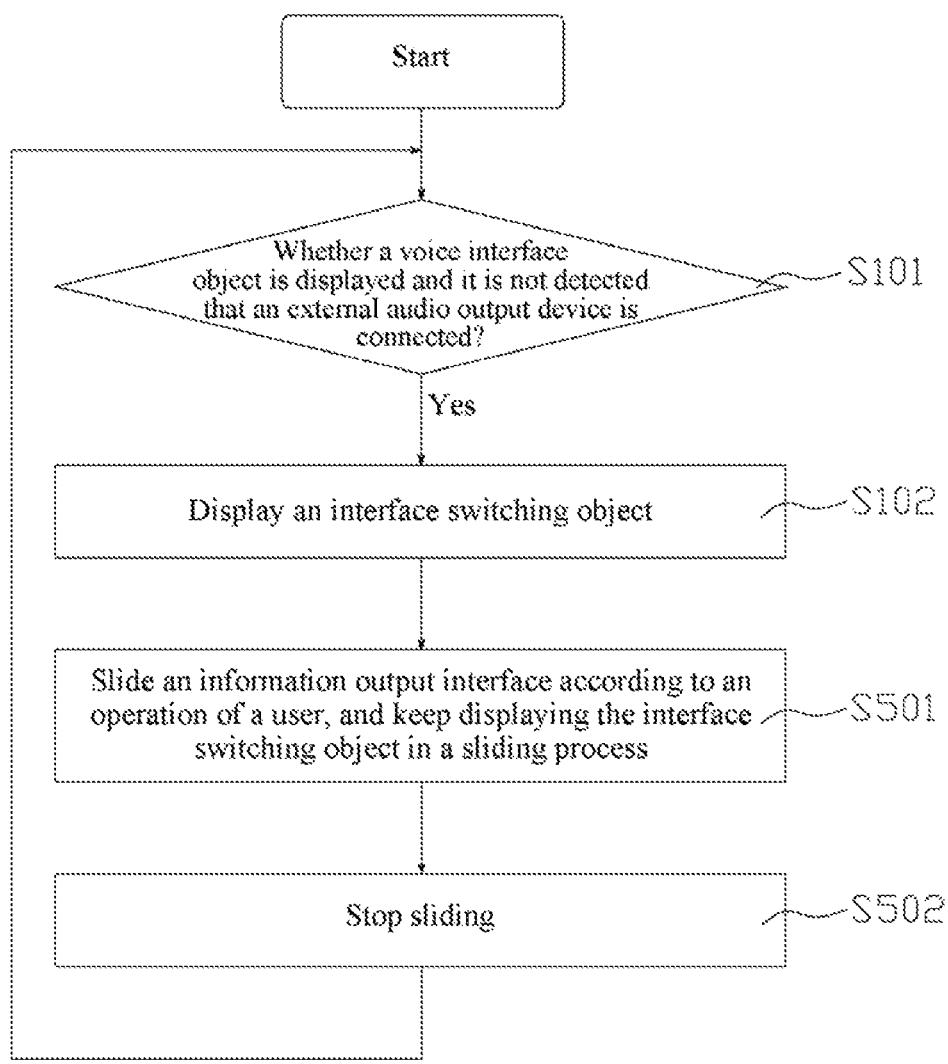
FIG. 9 is a flowchart of a method for switching an audio output device according to various embodiments.

Various embodiments provides a method for switching an audio output device, which is similar to the method in the various embodiments, but also different from the method in the various embodiments in that, referring to FIG. 9, after block S102, the following may be further included.

Block S501: Slide the information output interface according to an operation of the user, and keep displaying the interface switching object in a sliding process of the information output interface. As described in the various embodiments, the sliding process of the information output interface refers to the first phase and the second phase of the sliding.

Block S502: Perform block S101 after the sliding of the information output interface is stopped. In addition to being completely still, in the third phase of the sliding, the sliding of the information output interface is stopped.

According to the method in various embodiments, a procedure of determining whether an interface switching object is displayed/hidden is not performed in a sliding process of an information output interface, which can avoid an invalid operation and save processing time of a processor.

Figure 10:
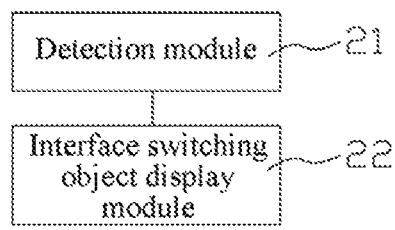
FIG. 10 is a structural block diagram of an apparatus for switching an audio output device according various embodiments.

Various embodiments provide an apparatus for switching an audio output device, which may be applied to the mobile electronic apparatus shown in FIG. 1, where the mobile electronic apparatus includes an information output interface. As shown in FIG. 10, the apparatus in this embodiment includes a detection module 21 and an interface switching object display module 22.

The detection module 21 is configured to, after a predetermined event is captured on the information output interface, detect whether a voice interface object representing a voice message is currently displayed on the information output interface and detect whether an external audio output device is currently connected to the mobile electronic apparatus. The detecting, by the detection module 21, whether a voice interface object representing a voice message is currently displayed on the information output interface includes acquiring all voice interface objects on the information output interface, performing intersection detection on a coordinate range of each voice interface object and a current screen, and, if at least one voice interface object intersects the current screen, determining that a voice interface object is currently displayed.

The interface switching object display module 22 is configured to, if it is detected that a voice interface object is currently displayed and it is not detected that an external audio output device is connected to the mobile electronic apparatus, display an interface switching object on the information output interface, where the interface switching object is used for correspondingly switching an audio output device of the mobile electronic apparatus according to an input operation of a user.

According to the apparatus in this embodiment, when there is voice information on a current screen, an interface switching object is displayed, which can enable a user to conveniently switch an audio output device, thereby meeting an audio output demand of the user in different scenarios.

Figure 11:
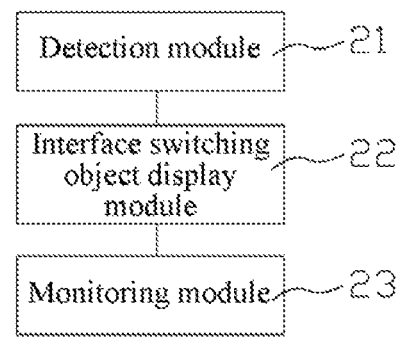
FIG. 11 is a structural block diagram of an apparatus for switching an audio output device according to various embodiments.

Various embodiments provide an apparatus for switching an audio output device, which is similar to the apparatus in the various embodiments, but also different from the apparatus in the various embodiments in that, referring to FIG. 11, the apparatus in this various embodiment further includes a monitoring module 23, configured to, if it is detected that an external audio output device is connected to the mobile electronic apparatus, notify the interface switching object display module 22 of hiding the interface switching object. For example, a callback may be registered in an operating system 122 and is executed after a user inserts an earphone or a Bluetooth earphone is connected, for notifying that the interface switching object is hidden or directly triggering and performing block S101.

As described in the various embodiments, a process of detecting whether there is voice information and whether there is an external audio output device is triggered only after the predetermined event is captured on the information output interface. However, in a case in which the information output interface remains unchanged (the predetermined event is not captured), the user may insert an earphone or a Bluetooth earphone is connected. In this case, the interface switching object display module 22 can only be triggered by means of a system callback, or the interface switching object is directly hidden.

According to the apparatus in various embodiments, when a predetermined event is not detected on an information output interface, an interface switching object can still be hidden in time, which increases available space of the information output interface.

Figure 12:
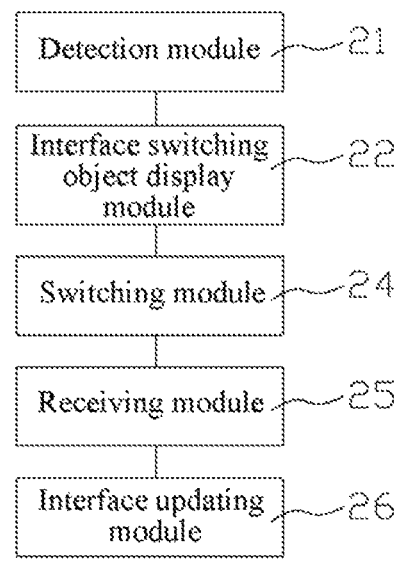
FIG. 12 is a structural block diagram of an apparatus for switching an audio output device according to various embodiments.

Various embodiments provides an apparatus for switching an audio output device, which is similar to the apparatus in the various embodiments, but also different from the apparatus in the various embodiments in that, referring to FIG. 12, the apparatus in this various embodiment further includes a switching module 24, a receiving module 25, and an interface updating module 26.

The switching module 24 is configured to switch the audio output device of the mobile electronic apparatus after a predetermined input operation is detected on the interface switching object. The receiving module 25 is configured to receive an identifier of the audio output device that is sent by a system. The interface updating module 26 is configured to determine, according to the identifier of the audio output device that is sent by the system and an identifier of the audio output device of the mobile electronic apparatus before system invoking is performed to switch the audio output device, whether the audio output device is changed, an, if the audio output device is changed, correspondingly modify content of the interface switching object.

For example, when the audio output device is switched from a loudspeaker to a handset, the content of the interface switching object 20 may be text or an icon that represents switching of the audio output device to the loudspeaker. When the audio output device is switched from a handset to a loudspeaker, the content of the interface switching object 20 may be text or an icon that represents switching of the audio output device to the handset.

According to the apparatus in various embodiments, after an audio output device is switched, content of an interface switching object is further correspondingly modified, so that the interface switching object is more visual.

Figure 13:
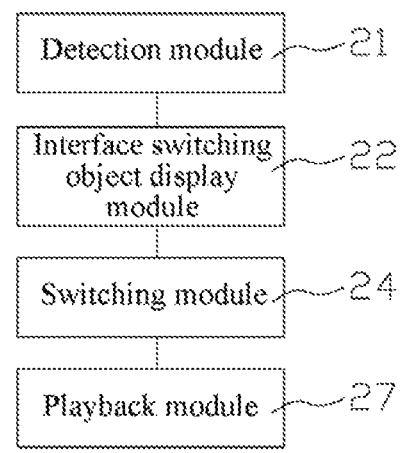
FIG. 13 is a structural block diagram of an apparatus for switching an audio output device according to various embodiments.

Various embodiments provide an apparatus for switching an audio output device, which is similar to the apparatus in the various embodiment, but also different from the apparatus in the various embodiments in that, referring to FIG. 13, the apparatus in this various embodiment further includes a playback module 27, configured to, if the audio output device is changed and current, there is voice information that is being played, replay, by using the switched audio output device, the voice information that is being played.

For example if there is currently voice information being played by using a handset, in a playback process, the user may switch the audio output device to a loudspeaker by using the interface switching object 20, and after the audio output device is switched according to the method in the various embodiments, the voice information that is being played is replayed by still using the switched audio output device, that is, the voice information that is being played is replayed by using the loudspeaker.

According to the apparatus in various embodiments, when a user switches an audio output device, related voice information can be automatically played, which makes the use more convenient for the user.

Figure 14:
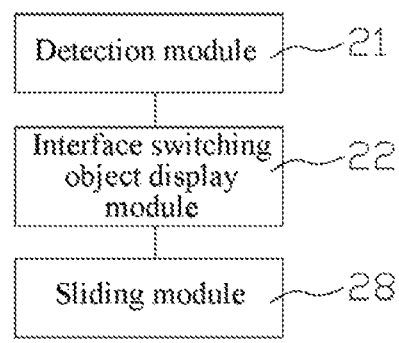
FIG. 14 is a structural block diagram of an apparatus for switching an audio output device according to various embodiments.

Various embodiments provide an apparatus for switching an audio output device, which is similar to the apparatus in the sixth embodiment, but also different from the apparatus in the sixth embodiment in that, referring to FIG. 14, the apparatus in this embodiment further includes a sliding module 28, configured to slide the information output interface according to an operation of the user, and keep displaying the interface switching object in a sliding process of the information output interface; and after the information output interface is stopped from sliding, notify the detection module 21 to perform detection again.

According to the apparatus in various embodiments, a procedure of determining whether an interface switching object is displayed/hidden is not performed in a sliding process of an information output interface, which can avoid an invalid operation and save processing time of a processor. Further, various embodiments of the present disclosure further provide a computer readable storage medium, in which a computer executable instruction is stored, and the computer readable storage medium, for example, is a non-volatile memory such as an optical disc, a hard disk, or a flash memory. The computer executable instruction is used for enabling a computer or a similar computing apparatus to complete the foregoing method and apparatus.

The above descriptions are merely various embodiments of the present disclosure, and are not intended to limit the present disclosure in any form. Although the present disclosure has been disclosed above through the various embodiments, the embodiments are not intended to limit the present disclosure. A person skilled in the art can make some equivalent variations, alterations or modifications to the above-disclosed technical content without departing from the scope of the technical methods of the present disclosure to obtain equivalent embodiments. Any simple alteration, equivalent change or modification made to the above embodiments according to the technical essence of the present disclosure without departing from the content of the technical methods of the present disclosure shall fall within the scope of the technical methods of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more procedures within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A method for switching an audio output device, applied to a mobile electronic apparatus including an information output interface, comprising:
    after a predetermined event is captured on the information output interface, detecting whether a voice interface object representing a voice message is currently displayed on the information output interface, and detecting whether an external audio output device is currently connected to the mobile electronic apparatus;
    if it is detected that a voice interface object is currently displayed, and it is not detected that an external audio output device is connected to the mobile electronic apparatus, displaying an interface switching object on the information output interface, to correspondingly switch an audio output path of the mobile electronic apparatus according to an input operation of a user;
    switching the audio output path of the mobile electronic apparatus from a first audio output device to a second audio output device after a predetermined input operation is detected on the interface switching object;
    listening to a system event and receiving an identifier that is sent by a system after switching the audio output path;
    if the identifier that is sent by the system is different from an identifier of the first audio output device of the mobile electronic apparatus before the audio output path is switched, determining that the audio output path is changed and correspondingly modifying content of the interface switching object; and
    if the audio output path is changed and currently there is voice information that is being played, replaying, by using the second audio output device, the voice information that is being played from the beginning.

2. The method for switching an audio output device according to claim 1, wherein the detecting whether a voice interface object representing a voice message is currently displayed on the information output interface comprises:
    acquiring all voice interface objects on the information output interface;
    performing intersection detection on a coordinate range of each voice interface object and a current screen; and
    if at least one voice interface object intersects the current screen, determining that a voice interface object is currently displayed.

3. The method for switching an audio output device according to claim 1, further comprising: if it is detected that an external audio output device is connected to the mobile electronic apparatus, hiding the interface switching object.

4. The method for switching an audio output device according to claim 1, further comprising:
    sliding the information output interface according to an operation of the user, and keeping displaying the interface switching object while sliding the information output interface; and
    after the information output interface is stopped from sliding, re-detecting whether a voice interface object representing a voice message is currently displayed and whether an external audio output device is connected to the mobile electronic apparatus, and correspondingly displaying or hiding the interface switching object.

5. An apparatus for switching an audio output device, applied to a mobile electronic apparatus comprising an information output interface, comprising:
    a detection module, that detects whether a voice interface object representing a voice message is currently displayed on the information output interface after a predetermined event is captured on the information output interface, and detects whether an external audio output device is currently connected to the mobile electronic apparatus; and
    an interface switching object display module, that displays an interface switching object on the information output interface, if it is detected that a voice interface object is currently displayed, and it is not detected that an external audio output device is connected to the mobile electronic apparatus, to correspondingly switch an audio output path of the mobile electronic apparatus according to an input operation of a user;

a switching module, configured to switch the audio output path of the mobile electronic apparatus from a first audio output device to a second audio output device after a predetermined input operation is detected on the interface switching object;

a receiving module, configured to listen to a system event and receive an identifier that is sent by a system after switching the audio output path; and an interface updating module, configured to determine, if the identifier that is sent by the system is different from an identifier of the first audio output device of the mobile electronic apparatus before the audio output device is switched, that the audio output path is changed; and correspondingly modify content of the interface switching object;

a playback module, configured to if the audio output path is changed and currently there is voice information that is being played, replay, by using the second audio output device, the voice information that is being played from the beginning.

6. The apparatus for switching an audio output device according to claim 5, wherein the detecting, by a detection module, whether a voice interface object representing a voice message is currently displayed on the information output interface comprises:

acquiring all voice interface objects on the information output interface;

performing intersection detection on a coordinate range of each voice interface object and a current screen; and if at least one voice interface object intersects the current screen, determining that a voice interface object is currently displayed.

7. The apparatus for switching an audio output device according to claim 5, further comprising: a monitoring module, configured to: if it is detected that an external audio output device is connected to the mobile electronic apparatus, notify the interface switching object display module of hiding the interface switching object.

8. The apparatus for switching an audio output device according to claim 5, further comprising:

a sliding module, configured to slide the information output interface according to an operation of the user, and keep displaying the interface switching object while sliding the information output interface; and after the information output interface is stopped from sliding, notify the detection module of performing detection again.

\* \* \* \* \*